United States Patent [19]
Archer

[11] 4,026,167
[45] May 31, 1977

[54] PLANETARY TRANSMISSION

[76] Inventor: James M. Archer, 2917 Grand Ave., Billings, Mont. 59102

[22] Filed: May 2, 1975

[21] Appl. No.: 574,090

[52] U.S. Cl. .................................................. 74/785
[51] Int. Cl.² ........................................... F16H 57/10
[58] Field of Search ............ 74/785, 786, 787, 788; 192/12 C

[56] References Cited

UNITED STATES PATENTS

| 2,472,559 | 6/1949 | Arnold et al. | 74/785 |
| 2,870,655 | 1/1959 | Rockwell | 74/785 |
| 2,918,832 | 12/1959 | Meyers | 74/785 |
| 3,069,929 | 12/1962 | Hansen | 74/785 |
| 3,093,013 | 6/1963 | Forster et al. | 74/788 |
| 3,260,331 | 7/1966 | Borman, Jr. | 74/785 X |
| 3,359,833 | 12/1967 | Flinn | 74/785 |
| 3,772,940 | 11/1973 | Ohtsuka et al. | 74/785 |

FOREIGN PATENTS OR APPLICATIONS

| 558,529 | 8/1932 | Germany | 74/785 |

Primary Examiner—Samuel Scott
Assistant Examiner—Lance W. Chandler
Attorney, Agent, or Firm—Cushman, Darby & Cushman

[57] ABSTRACT

A two-speed planetary transmission having a sun gear input and a carrier output includes a ring gear connectable to the carrier and to the fixed transmission housing by friction devices which are spring-biased toward the engaged position. The biasing spring for the ring-carrier friction device is carried by the ring and the friction device actuator. Shifting from one mode of operation to the other is effected by releasing the ring-housing friction device and engaging the ring-carrier friction device or by engaging the ring-housing friction device and releasing the ring-carrier friction device, thereby achieving shifting with a minimum of friction between the ring-carrier friction device spring and its non-rotating actuator. In the event of loss of control force to the friction device actuators the transmission becomes locked, and inertia forces from the load are absorbed by the friction devices without being transferred through the planet gears.

36 Claims, 1 Drawing Figure

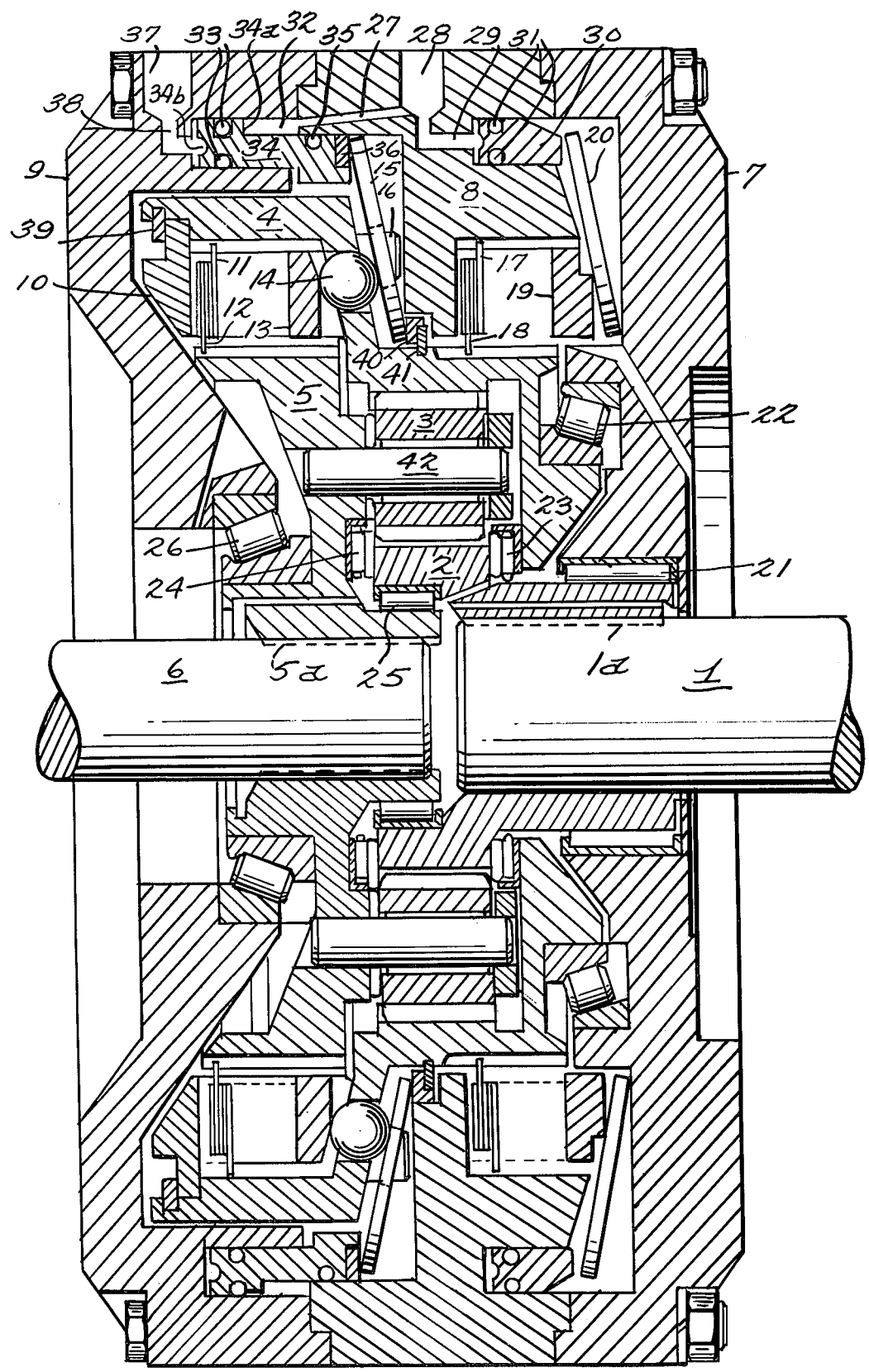

PLANETARY TRANSMISSION

This invention relates to ratio changing power transmission systems wherein there is provided free wheeling, ratio changes, and lock up means. The transmission systems are particularly adapted for use in combination with hydraulically powered machines but are not limited to such use.

BACKGROUND OF THE INVENTION

While the primary problems giving rise to the invention have arisen from hydraulically powered vehicles and the invention described is particularly suited to such vehicles, it will be recognized that the invention is applicable to a variety of other machines and circumstances. However, inasmuch as the problems have arisen in the field of hydraulically driven vehicles, the invention will be hereinafter discussed as to both problem and solution in that application. The discussion directed to use on hydraulically powered vehicles is for illustrative purposes only and is not intended to be limiting.

The invention is applicable to a variety of ratio changing power transmission requirements, however applied, between a power source and a load and the invention shall be understood accordingly. As the use of hydraulic pumps and hydraulic motors in a power transmission application becomes more common, some of their advantages and disadvantages should be examined. By providing in a simple hydraulic drive system a variable displacement pump and fixed displacement motor, pressure in the system determines motor torque output and volume determines the speed of the motor. Inasmuch as the pump's displacement is variable, it will provide an infinitely variable motor output speed up to its maximum volumetric capacity. However, allowable system pressure, expense, and physical size of hydraulic components impose narrow limits of operation. It is therefore desirable to provide a mechanical ratio changing means which increase the spectrum of operational characteristics.

It is also desirable to effect such ratio changing in a smooth controllable manner and without interrupting the continuous flow of power. As is readily understood, conventional manually shifted gear changing transmissions of the automotive and truck type are totally unsuited to this general application inasmuch as they require a power flow interruption and pass through a "neutral position" during the ratio changing operation.

Interruption of any continuing force present in the power train acting upon the load will either increase or decrease the inertial or static force of that load thus creating a potential load "runaway" or loss of momentum during such power train interruption. A neutral position merely magnifies the foregoing problem or hazard in that the uninterrupted mechanical connection to the load must be re-established from the neutral position immediately, to control the load. Re-establishing that connection becomes increasingly difficult as the differential speed relationship between the load and the power source broadens.

Further, should hydraulic failure take place in either the hydraulic components or their associated lines, the vehicle or load becomes uncontrollable and must then be arrested by some other means.

Another problem presents itself when, for whatever reason, one attempts to tow a hydraulically powered vehicle or otherwise manually rotate the hydraulic motor output shaft, in that hydraulic circuitry normally will render the motor effectively locked to the pump and then to the engine or power source. It is therefore advantageous to provide a means of effectively disengaging the hydraulic motor from the remaining power train thus enabling one to tow or rotate said power train components independent of the hydraulic drive system.

Accordingly, the objects of the invention are to overcome the aforementioned problems and to provide:

I. A power transmission device capable of effecting a ratio change between a power source and a load without appreciably effecting the flow of power from the source to the load.
II. A device, as above mentioned, not having a neutral position during the normal ratio changing operation.
III. A device, as above mentioned, capable of locking up or arresting a load upon need or demand, such arresting capability being effective without directing any resultant forces through the transmission gear components.
IV. A device, as above mentioned, providing a means of effectively disengaging the power source from the load as may be required.
V. A device, as above mentioned, having long life while transmitting power at both low and high operational speeds.

Transmission devices utilizing planetary gear sets comprised of a ring gear, planet gear or gears, a planet gear carrier and a sun gear, being controlled by frictionally engageable clutch means such as disc clutches or bands are generally known and widely used. In transmissions of this general type, one or more of the following undesirable and limiting methods or components are usually present:

1. Rotating pressure seals.
2. Extremely large diameter bearings.
3. High pressure required to effect function.
4. Clutch release bearings which are required to accept continual rotational thrust loads for the full time that selected mode or ratio is in use.
5. Hydraulic control circuitry and valves of a complex nature.

SUMMARY OF THE INVENTION

To clarify the undesirability and limiting nature of the above-mentioned features, each is considered with respect to the present invention which embodies none of them. It is the broad object of the present invention to overcome many disadvantages of prior art through novel innovations and arrangement of components. Referring to the features numbered (1) through (5) above the present invention provides:

1. A means of pressure operation to effect transmission functions not requiring the use of rotating shaft seals. Such seals when reduced to practice in rotating applications are generally required to be of metallic construction and characteristically bypass or leak a considerable amount of pressure control fluid thereby necessitating the use of a sump and scavaging pump means not required in the present invention.

2. A power transmission device of inexpensive manufacture capable of both low and high speed operation, such capabilities owing in part to novel arrangement and design which is not dependent upon use of extremely large diameter bearings having the imposed limitations of speed, cost, and wear associated therewith.

3. A power transmission device having a low pressure control requirement of approximately 100 PSI to change ratios and free wheel. "Locking up" or arresting loads is brought about by the absence of control pressure and is considered to be an essentially automatic function in most cases.

4. A means of effecting release of resiliently biased frictionally engageable rotating couplings or the like by non-rotating co-acting components without the need or use of the release bearing being continually operative for the total duration of time the transmission is operated in that selected drive mode or ratio. In the present invention sliding rotary contact with a rotating component by a co-acting non-rotating component occurs only momentarilly. Such sliding rotary contact is limited in duration to the split second of time required to effect ratio change, inasmuch as the rotating component ceases to rotate upon coupling disengagement, therefore requiring only a minimum bearing provision. This function will be explained in greater detail hereinafter.

5. A power transmission device of such simple control requirements as to permit use of existing and generally available valving to effect transmission function.

The invention also provides a power transmission device comprising generally known components applied, designed, and arranged in such novel manner as to render said transmission device capable of power transmission at both low and high rotational speeds, the latter as compared with winch drives, wheel motors, truck transmissions, and the like which are generally regarded as low speed applications.

The invention also provides a power transmission device of benefically small and compact physical dimensions, particularly in regard to overall length thereby permitting the retro-fit of said transmission to existing equipment and designs with either a minimum of, or, no alteration required.

Further, the invention provides a power transmission device being of such construction as to provide a sizeable hole centrally and axially which is free of obstruction extending from end to end for the entire length of said transmission. The purpose of such hole being to receive male power transmission shafts in both the input and output ends of said transmission; it being possible for such shafts to be near abutment with each other. This "through hole" thus insures a substantial length of splined engagement for such shafts and is of understandable importance when one considers the beneficial but extremely short length of the transmission of the present invention. An additional purpose of the aforementioned through hole is to provide for an alternate means of arranging the input and output shafts of said transmission, so that either shaft may be run axially and concentrically through the other, thus making it possible to both input and receive power from one end of said transmission.

Still further the invention provides a power transmission device of sufficient simplicity with respect to the novel portions, which may be tooled and placed in production at a minimum of expense.

Certain terminology is used in the following description for convenience in reference only and will not be limiting. The words "upwardly", "downwardly", "leftwardly" and "rightwardly" will refer to directions in the drawing to which reference is made. The words "front" and "rear" will be used relative to the input and output ends, respectively, of the transmission. The words "inwardly" and "outwardly" will refer to directions toward and away from, respectively, the geometric center of the device and designated parts thereof.

In the power transmission device illustrated, certain parts, holes, passages, and pins have been shown on a common plane not being conducive to their function or consistent with their actual circumferal location, despite their radial and axial positions being essentially correct.

One example of such illustration depicts placement of pressure control ports 37 and 28 in conflict with the threaded fastener shown which holds the case assembly 7, 8, and 9 together. Such conflict is not present in actual practice and is averted by proper indexing about the radius so described. However, any deviation from actual location has been in the interest of promoting clarity and convenience of understanding the invention, and is done for illustrative purposes only.

Although the transmission device as herein illustrated and described has been successfully reduced to practice essentially as shown, certain modifications mainly for convenience of manufacture as may be required are contemplated. Such modifications adopted while being different in description and illustration will be included within the scope and embodiment of the claims.

DETAILED DESCRIPTION

Previously mentioned, and other objects of the invention will become more apparent to those skilled in the art by reference to the following detailed description when viewed in light of the accompanying drawing which is a longitudinal sectional view of a transmission embodying the principles of the invention.

Referring now to FIG. 1, the transmission is driven by a power source through means of an input shaft 1 fixedly engaged by splines la to the bore of input sun gear 2 which is in rotatable driving mesh with a plurality of planet gears 3, they at the same time, being similarly meshed with an internally toothed ring gear 4.

The planet gears 3 are rotatably mounted in fixed position to planet gear carrier output member 5 by means of driving axle pins 42. Output member 5 has a splined bore 5a to receive a correspondingly splined output shaft 6.

A bearing 26 supports the output member 5 at its rearward end while a bearing 25 adds support and insures concentricity with the sun gear 2 which in turn is carried by a bearing 21. Thrust loads imposed through use of helical gears are accepted by bearings 26, 24, 23 and 22 with bearings 26 and 22 carrying radial loads as well.

The ring gear 4 is externally toothed about its periphery to slidably but non-rotationally engage a plurality of friction disks 18 which alternately are interspaced with similar friction disks 17 slidably but non-rotatably engaged to a non-rotating transmission case 8, thus establishing a frictional connecting means between the rotatable ring gear 4 and the non-rotatable case 8 when axial force is exerted upon the friction disks. The case 8 or housing is assumed to be fixed to a vehicle frame or the like.

Resilient biasing means taking the form of a disk spring 20 such as a Bellville spring, acts upon a pressure plate 19 thereby axially compressing the friction device 17, 18 thus establishing a rigid connection between the ring gear 4 and the transmission case 8. This frictional connection is released upon demand by axial force exerted against and compressing the disk spring 20 by an annular piston 30 which derives its force from fluid pressure introduced through a port 28 then through a main passage 29 to the face of the piston 30. The fluid pressure is contained by annular seals 31 disposed between the piston 30 and the annular bore in which the piston 30 is disposed.

A pressure passage 27 which is in communication with the port 28 delivers fluid pressure, when present, from the port 28 to a pressure sealed chamber 32 which acts upon face 34a of a second annular piston 34 causing it to retract fully within its bore. The piston 34 is provided with annular seals 33 and 35 in order to contain the fluid pressure in the chamber 32 or the chamber 38. Pressure introduced through a port 37 then through a passage 38 to piston face 34b to force piston 34 to move to the right so as to exert axial force upon a disk spring 15 to thereby release a second friction device 11, 12. Such release is effected by the non-rotating sealed piston 34 acting against the sometimes rotating disk spring 15 through a flat axially facing annular bearing 36 carried by the piston 34. A pivot ring 40 and a retaining ring 41 serve as a pivotal abutment against which the protruding inner bore of the disk spring 15 which is maintained. Rotating unity of the spring 15 and the ring gear 4 is established by drive pins 16 which project from ring gear 4 through holes in said spring 15. Such holes are radially elongated so as not to inhibit flexing action of the spring 15. The spring 15 produces axial biasing force to the left to axially compress friction disks 11 and 12 by transmitting its force through a plurality of balls 14 which act upon pressure plate 13 thus compressing the friction device against a backup pressure plate 10 and a retaining ring 39 thus obtaining a frictional but solid union between the output member 5 and the ring gear 4. The balls 14 are disposed in an annular pattern about the axis of the ring gear 4, and each ball is disposed in a separate axially extending passage 14a in the gear 4. As is illustrated, friction device 11 is axially slidable but non-rotatably engaged, through corresponding toothed means, to an internal bell like bore of the ring gear 4. The disks 12 are similarly carried by the toothed outer periphery of the output member 5.

The transmission case 8 or housing is made up of two end plates 7 and 9 which are attached to a central annular member 8, thus achieving integrity between not only said housing parts 7, 8, and 9 but also with any input or output device afixed thereto.

REDUCTION SPEED OPERATION

The transmission is shown in the drawing at rest with no control pressure applied to either port 37 or 28. As reduced to practice in the case of this embodiment pressure to operate the transmission is taken from an integral charge pump used to feed a main driving hydraulic pump. Such charge pumps are common to hydraulic drive systems of closed loop design and generally operate at pressures of 100 to 200 PSI.

Therefore to effect reduction speed, pressure of sufficient magnitude is directed to the port 37 which acts upon the annular piston 34 causing it to move axially forward compressing the disk spring 15 against central housing member 8, thereby releasing frictional engagement of the friction device 11–12 and allowing the output member 5 to rotate independently of the ring gear 4.

Considering that no pressure is applied to the port 28 which is vented to tank, oil present in the chamber 32 is allowed to be similarly vented through passage 27 leading to port 28 as the piston 34 displaces it.

Consistent with no pressure being applied to the port 28, the friction device 17–18 remains engaged due to the axial force exerted by the biasing spring 20.

The planetary gear set, being controlled in this particular configuration, is commonly described as being "sun driving carrier, ring held".

Specifically described, rotational input power from the shaft 1 drives the fixedly attached sun gear 2 which drives the planet gears 3 and being in mesh with both sun and ring gears. Since the ring gear 4 is non-rotatable by virtue of being connected to the case 8 by the friction device 17, 18, rotational power input causes the planet gears 3 by reactionary force, to roll around the internal toothed bore of the ring gear 4 and through pins 42 will cause the carrier output member 5 to rotate, thereby effecting a planetary reduction of predetermined ratio to drive the output shaft 6.

Some advantages of the novel mechanical arrangement in this invention are now quite evident in that friction device 11 and 12 and its release mechanism 13, 14, and 15 are an integral part of the ring gear 4 and are not rotating while the reduction speed is employed. Bearing 36 is operational therefore, only while the piston 34 is in the process of engaging or disengaging friction device 11–12, the duration of such operation not normally exceeding one second. Since these parts are not rotating, contact by non-rotating piston 34 does not require "full time" bearing operation between the piston and friction device as is commonly found in other designs. The aforementioned advantage also precludes the need of undesirable and expensive rotating pressure seals which is an even more common approach to the problem of rotating frictional coupling control than the full time bearing solution.

DIRECT SPEED OPERATION

Direct drive or constant speed relationship between input and output shafts is obtained by rendering the planetary gear set inoperative through means of solidly connecting at least two of its rotatable components. Such a connection is established in the present invention through the friction device 11–12 effectively affixing the ring gear 4 to the carrier output member 5 thus achieving unity of planetary gear elements which will then rotate as one. To effect function of direct drive operation transitionally from reduction speed then, the following sequence takes place: control pressure is simultaneously relieved from port 37 and redirected to port 28. Upon release of pressure at port 37, oil present between passage 38 and piston 34 is displaced and vented to tank as the piston 34, being acted upon by the spring 15, retracts rearwardly into its bore. As bias spring 15 is then allowed to exert its force against the balls 14 and pressure plate 13, friction device 11–12 is being compressed thus becoming frictionally engaged. Simultaneous release of the friction device 17–18 takes place due to control pressure acting against the piston 30 so as to compress the spring 20 against case end plate 7. This relieves axial force against the friction disks 17 and 18 thereby causing the ring gear 4 to be rotatably released from the case 8. It is apparent now that no neutral position has been present during the short time of the speed change transitions, in view of simultaneous friction device action. This action can be easily imagined as shown on a graph in the form of an X, the crossover point illustrating the instantous value between engagement and release of the clutchs and ratios.

The ratio change to direct drive is now effected in that rotational input power from the shaft 1 drives the fixedly attached sun gear 2 which attempts to drive the planet gears 3 but cannot in view of friction device 11–12 creating unity between the ring gear 4 and the carrier output member 5. Therefore elements 1, 2, 3, 4, 5, and 6 become effectively one member resulting in a direct driving coupling.

Inasmuch as the disk spring 15 has now become a rotating member, it is necessary to prevent continuing contact of the non-relating piston 34 and its bearing 36 with the non-rotating spring. Such contact or dragging is prevented by fully retracting the piston 34 rearwardly in its bore by means of pressure being present in the chamber 32 as derived from the port 28 and conducted through passage 27. The pressure then acting upon the piston 34 accomplishes its full retraction.

LOAD ARRESTING OPERATION

A load arresting feature is, by virtue of design, inherent in the invention in that should both clutches 11, 12 and 17, 18 be engaged simultaneiously all rotating components will be frictionally engaged to the non-rotational case 8. It follows then that should loss of control pressure occur at either port 37 or 28 whether from hydraulic failure or demand, both friction devices will engage, thus arresting whatever load is tending to maintain rotation of the shaft 6.

A not-immediately recognized but very important advantage of the invention over prior art is revealed in light of the following. Should an emergency require a load to be arrested, such load will effectively become the power source thus causing the output member or carrier 5 to become the input member which should then be viewed as having an extremely high moment of inertia. It is desirable then to arrest the load without subjecting the gear mechanism to the shock and strain of this potentially high moment of inertia. It is also not unreasonable to assume such an arresting emergency will exist as a result of gear train failure in the transmission itself. Inspection of the drawing will show that in the present invention all gear components are by-passed while arresting a load. That is, the shaft 6 would now become an input shaft attempting to rotate member 5 which is frictionally engaged by friction device 11–12 to gear 14 which is similarly engaged directly to the case 8 resulting in complete bypass of all gear components.

FREE WHEELING OPERATION

Consistent with desirable disconnection of power train components from a hydraulic drive system connected to the shaft 1, pressure introduced to both ports 37 and 28 simultaneously will result in frictional disengagement of both friction devices 11, 12 and 17, 18 . This will render the output shaft 6 free to rotate independently of input shaft 1. It is understood that the functional area of piston 34 is sufficient to overcome the combined disk spring bias 15 and retraction force present in chamber 32 while in this operating condition.

As indicated previously the illustrated transmission has particular utility in combination with a vehicle, especially an off-the-road vehicle, having a hydrostatic transmission which receives rotary power from the vehicle engine. In this case the input shaft 1 is connected to the output shaft of the hydrostatic transmission and the output shaft 6 is connected to the drive train for the vehicle drive means, such as wheels. Fluid pressure for the ports 28 and 37 may be obtained from the hydrostatic transmission, and the application and release of pressure to and from the ports may be effected by the vehicle operator by means of conventional valving or may be effected automatically.

It is contemplated that, in other embodiments, the actuating forces for the friction devices can be applied by mechanical levers or the like rather than by fluid pressure. The biasing forces on the friction devices may be effected by other resilient devices such as coil compression springs.

What is claimed is:

1. A transmission comprising a rotatable input member; a rotatable output means; a planetary gear set having a rotatable first element connected to the input means, a rotatable second element connected to the output means and a rotatable third element, a first engageable and disengageable friction device for locking and unlocking said third element to a non-rotatable transmission element; second engageable and disengageable friction device for connecting together and disconnecting said second and third elements, the arrangement being such that the transmission is shiftable by operation of said first and second friction device between two modes of operation, one of said modes arising when said third element is non-rotatably locked to a non-rotating transmission element and when said first and second elements rotate and the other mode arising when all said elements rotate, biasing means rotatable with said second and third elements when said second and third elements are connected together by said second friction device for applying a biasing force to said second friction device to engage the same, and permanently non-rotating axially adjustable means movable between a first position out of engagement with said biasing means and a second position in direct engagement with said biasing means to remove the biasing force from said second friction device, whereby when said first and second friction devices are operated simultaneously to effect shifting from one mode to another mode the resulting sliding friction forces between said adjustable means and said biasing means exist for only a short period of time.

2. A transmission as in claim 1 wherein said non-rotating adjustable means includes a double-acting fluid pressure operated piston having opposite faces and means for selectively directing fluid pressure to said faces in order to selectively move said piston between said first and second positions.

3. A transmission as in claim 2 including: a single-acting fluid operated piston for disengaging said first friction device; a fluid pressure passage for supplying and relieving pressure to and from said single-acting piston; a fluid pressure passage for supplying and relieving pressure to and from one face of said double-acting piston, and a further fluid pressure passage extending from the passage associated with said single-acting piston to the other face of said double-acting piston whereby pressure applied to said single-acting piston moves said double-acting piston to its first position.

4. A transmission comprising a rotatable input means; a rotatable output means; a planetary gear set having a rotatable first element connected to the input means, a rotatable second element connected to the output means, a rotatable third element, a first engageable and disengageable friction device for locking and unlocking said third element to a non-rotating transmission element; first biasing means biasing said first friction device in an engaged position; a second engageable and disengageable friction device for connecting together and disconnecting said second and third elements; second biasing means biasing said second friction device in an engaged position, the arrangement being such that the transmission is shiftable by operation of said first and second friction devices between two modes of operation, one of said modes arising when said third element is locked and when said first and second elements rotate and the other mode arising when all said elements rotate; first and second fluid pressure operated means engageable with said first and second biasing means to remove the biasing forces exerted thereby in order to effect shifting between modes, whereby a loss in fluid pressure results in engagement of both friction devices thereby locking said input and output means against rotation.

5. A transmission as in claim 4 wherein said first rotatable element is a sun gear, wherein said second rotatable element is a carrier which supports planet gears in toothed engagement with said third rotatable element and wherein said third rotatable element is a ring gear, whereby stresses during locking are transmitted through the friction devices rather than through the toothed planet gears.

6. A transmission comprising: a non-rotating transmission member, a planetary gear set having a sun input gear in toothed engagement with planet gears, an output carrier supporting said planet gears, and a ring gear in toothed engagement with said planet gears; a first friction device for frictionally locking and unlocking said ring gear to the non-rotating transmission element; a second friction device for frictionally connecting together and disconnecting said ring gear and said carrier and means for operating each friction device independently of the operation of the other friction device whereby when said first and second friction devices are engaged and when the load on the transmission tends to rotate the carrier, said carrier is frictionally locked against rotation without the load-generated stresses being transferred through the gear connections between planets and sun gear and between planets and ring gear.

7. A transmission comprising: a rotatable input means; a rotatable output means; a gear set drivingly connected between said input and output means, said gear set being operable in at least two modes; first and second friction devices, each including a fluid pressure operated actuator, for operating said gear set in said modes; means providing a first fluid pressure passage for applying pressure to the actuator of said first friction device to operate the same in a predetermined mode, means providing a second fluid pressure passage for applying pressure to the actuator of said second friction device to operate the same in a predetermined mode, and a connecting passage extending between the actuator of said first friction device and said second passageway for transmitting fluid pressure to said actuator in an opposite mode when said second passageway is pressurized.

8. A transmission as in claim 7 wherein the actuator for said first friction device includes a single-acting piston having a single pressure face and wherein the actuator for said second friction device includes a double-acting piston having opposite pressure faces, said connecting passage communicating with said first fluid pressure passage and one pressure face of said double-acting piston.

9. A transmission as in claim 8 including means biasing each of said friction devices into an engaged position, said friction device actuators being arranged to disengage their respective friction devices when fluid pressure is supplied to the respective first and second passages.

10. A transmission comprising: a non-rotatable housing; a sun gear rotatably mounted in said housing; planet gears in toothed engagement with said sun gear; a carrier rotatably supported in said housing and supporting said planet gears; a ring gear having a first annular portion having internal teeth engaging said planet gears, a second annular portion disposed radially inward and axially spaced from said first portion and a third annular portion disposed radially outward and axially spaced from said first portion; annular bearing means between said second portion of said ring gear and said housing; a first engageable and disengageable friction device disposed radially outwardly of said first portion of said ring gear and between said first portion and said housing; a second engageable and disengageable friction device disposed in an annular space between said third portion of said ring gear and said carrier.

11. A transmission as in claim 10 wherein said carrier and said sun gear each include means for enabling a connection to be made with a rotatable drive-transmitting shaft outside said housing.

12. A transmission as in claim 10 wherein said carrier and said sun gear have hollow bores which are axially spaced apart from each other for receiving drive-transmitting shafts with essentially no obstruction lying between so as to provide an uninterrupted hole of substantial size extending centrally and axially through said transmission from one end to the other.

13. In a transmission having a fixed member, a planetary gear set drivingly connected between rotatable input and output means, the gear set having a rotatable sun gear drivingly to the input, a rotatable ring gear and a rotatable planet carrier supporting planet gears and drivingly connected to the output, a first friction device for connecting and disconnecting the ring gear to and from the fixed member, and a second friction device for connecting and disconnecting the ring gear and the carrier to and from each other, the improvement which comprises a construction which permits selective operation in a load arrest mode in which the transmission is frictionally locked and in which forces produced by an external load applied to the output means bypass all gear teeth, in a freewheeling mode in which rotation of the output means by a load applied thereto is not transmitted to the input means, and in direct drive and reduced speed modes, said construction comprising: first holding means applying a releasable holding force to said first friction device to releasably hold the same in an engaged position; second holding means applying a releasable holding force to said second friction device to releasably hold the same in an engaged position; first friction device control means for selectively removing and restoring the releasable holding force of said first holding means so as to selectively disengage and engage said first friction device, second friction device control means for selectively removing and restoring the releasable holding force of said second holding means so as to selectively disengage and engage said second friction device, each of said first and second control means being operable independently of each other to completely disengage and engage its respective friction device regardless of the position of the other friction device whereby the load arrest mode is effected by engaging both friction devices the arrangement being such that external load-generated forces are transferred from said output means to said carrier, then to said ring gear by said second friction device and then to said fixed member by said first friction device without said forces subjecting toothed gear connections to strain, whereby the freewheeling mode is effected by disengaging both friction devices and whereby shifting between direct and reduced speed modes effected by simultaneous engagement of one friction device and disengagement of the other friction device.

14. A transmission as in claim 13 wherein each of said holding means releasably holding its respective friction device in an engaged position applies a continuously acting biasing force on its respective friction device and wherein each of said friction device control means is operable to overcome the respective continuously acting biasing force.

15. A transmission as in claim 13 wherein said second holding means releasably holding said second friction device in an engaged position includes spring means rotatable with said ring gear and said carrier when said ring gear and carrier are connected together by said second friction device, said spring means applying a biasing force to engage said second friction device, and wherein said second control means includes a non-rotatable control member mounted for axial movement into engagement with said spring means for moving the same against its biasing force to thereby disengage said second friction device whereby when said first and second friction devices are operated simultaneously to effect shifting between direct drive mode and reduced speed mode the resulting sliding friction between said non-rotatable member and said spring means exists for only a short period of time.

16. A transmission as in claim 15 wherein said non-rotatable control member, in a position in which its friction device is engaged is axially spaced from and out of contact with said spring means.

17. A transmission as in claim 15 wherein said spring means includes a disc spring disposed concentric with said ring gear.

18. A transmission as in claim 17 wherein said ring gear includes an annular portion which faces in generally axial directions with respect to the axis of said ring gear, and wherein said disc spring and said second friction device are disposed adjacent opposite faces of said annular portion, said transmission further including at least one movable force-transmitting member extending through said annular portion for transmitting the force of said disc spring to said second friction device, and said non-rotatable control member being an annular piston concentric with said ring gear.

19. A transmission as in claim 18 wherein said force-transmitting member is a ball.

20. A transmission as in claim 18 wherein said annular piston is a double-acting fluid pressure operated piston having opposite pressure faces.

21. A transmission as in claim 18 wherein said first and second releasable holding means are continuously acting first and second bias means and wherein said first friction device control means includes a single-acting fluid pressure operated piston engageable with said first bias means and a first fluid pressure passage for supplying fluid pressure to said single-acting piston to move the same against said first bias means in a direction to disengage its friction device and for relieving fluid pressure from said single-acting piston, and wherein said second friction device control means includes a double-acting fluid pressure operated piston engageable with said second bias means and having first and second piston faces and a second fluid pressure passage for supplying fluid pressure to said first face to move said double-acting piston against said second bias means in a direction to disengage its friction device and for relieving fluid pressure from said first face, said transmission including a further pressure passage extending between said first fluid pressure passage and the second piston face of said double-acting piston whereby fluid pressure applied to said first pressure passage is also applied to the second face of said double-acting piston, said second piston face having a smaller effective pressure area than said first piston face so that uniform fluid pressure applied to both the first and second passages causes both pistons to move in friction device disengaging directions and so that fluid pressure applied to only one of the first and second passages while pressure is relieved from the other causes the pistons to move simultaneously to disengage one friction device while engaging the other friction device and so that relief of fluid pressure from both the first and second passages causes both friction devices to engage under the action of said first and second bias means.

22. A transmission as in claim 1 wherein said permanently non-rotating axially adjustable means includes a fluid-operated piston and port means for supplying and relieving pressure fluid to and from a face of said piston, said piston having an opposite face engageable with said biasing means.

23. A transmission as in claim 22 wherein said opposite face of said piston includes a plain bearing.

24. A transmission as in claim 1 further including separate biasing means for applying a biasing force to said first friction device to engage the same and separate adjustable means, operable independently of said first-named adjustable means for engaging said separate biasing means to remove the biasing force from said first friction device.

25. A transmission as in claim 24 wherein each of said adjustable means includes a fluid-operated piston and a separate port means for supplying and relieving pressure fluid to and from a face of the respective piston.

26. A transmission as in claim 25 wherein each of said pistons has an opposite face engageable with its respective biasing means.

27. A transmission as in claim 22 wherein said biasing means is a disc spring coaxial with said third element.

28. A transmission as in claim 27 including a pivot ring coaxial with said disc spring and being engageable by said disc spring to cause pivoting said disc spring.

29. A transmission as in claim 4 wherein said second biasing means is non-rotating when said second friction device is disengaged and cooperates with said second and third transmission element so as to rotate therewith when said second friction device is engaged.

30. A transmission as in claim 29 wherein said first and second biasing means are disc springs coaxial with said third transmission element.

31. A transmission as in claim 6 wherein said means for operating each friction device independently includes: separate means biasing each of said friction devices toward positions in which ring gear is locked to the non-rotating transmission element and is connected to the carrier, and a separate fluid pressure operated means associated with each biasing means and operable upon the application of fluid pressure to remove the biasing action of its respective biasing means from the respective friction device.

32. A transmission as in claim 31 wherein each of said biasing means includes a disc spring coaxial with said carrier and wherein each of said fluid pressure operated means includes a movable piston.

33. A transmission as in claim 32 including a separate pressure port for supplying and relieving fluid pressure to and from each piston.

34. A transmission comprising a rotatable input member; a rotatable output means; a planetary gear set having a rotatable first element connected to the input means, a rotatable second element connected to the output member and a rotatable third element, a first engageable and disengageable friction device for locking and unlocking said third element to a non-rotatable transmission element; a second engageable and disengageable friction device for connecting together and disconnecting said second and third elements, first biasing means for applying a biasing force to said first friction device to engage the same and first adjustable means for engaging said first biasing means to remove the biasing force from said first friction device, the arrangement being such that the transmission is shiftable by operation of said first and second friction devices between two modes of operation, one of said modes arising when said third element is non-rotatably locked to a non-rotating transmission element and when said first and second elements rotate and the other mode arising when all said elements rotate, second biasing means rotatable with said second and third elements when said second and third elements are connected together by said second friction device for applying a biasing force to said second friction device to engage the same, and non-rotating axially adjustable means movable independently of said first adjustable means between a first position out of engagement with said biasing means and a second position in engagement with said biasing means to remove the biasing force from said second friction device, whereby when said first and second friction devices are operated simultaneously to effect shifting from one mode to another mode the resulting sliding friction forces between said non-rotating axially adjustable means and said biasing means exist for only a short period of time.

35. A transmission as in claim 34 wherein said second biasing means is a disc spring coaxial with said third element.

36. A transmission as in claim 35 wherein said disc spring is carried by said third element.

* * * * *